US012711378B2

(12) United States Patent
Dong et al.

(10) Patent No.: US 12,711,378 B2
(45) Date of Patent: Aug. 18, 2026

(54) FEATURE EXTRACTION TECHNIQUES

(71) Applicant: PayPal, Inc., San Jose, CA (US)

(72) Inventors: Yanfei Dong, Singapore (SG); Zhe Chen, Singapore (SG)

(73) Assignee: PayPal, Inc., San Jose, CA (US)

( * ) Notice: Subject to any disclaimer, the term of this patent is extended or adjusted under 35 U.S.C. 154(b) by 445 days.

(21) Appl. No.: 18/356,725

(22) Filed: Jul. 21, 2023

(65) Prior Publication Data

US 2025/0028950 A1 Jan. 23, 2025

(51) Int. Cl.
*G06N 3/08* (2023.01)
*G06N 3/042* (2023.01)

(52) U.S. Cl.
CPC ............... *G06N 3/08* (2013.01); *G06N 3/042* (2023.01)

(58) Field of Classification Search
CPC ................................. G06N 3/08; G06N 3/042
See application file for complete search history.

(56) References Cited

U.S. PATENT DOCUMENTS 11,308,497 B2 4/2022 Dong
11,544,501 B2 1/2023 Dong
11,595,291 B2 2/2023 Chen
11,606,367 B2 3/2023 Chen
11,610,098 B2 3/2023 Dong
2008/0071692 A1 3/2008 Jain
2019/0132344 A1 5/2019 Lem
2020/0136923 A1 4/2020 Altshuler
2020/0160813 A1 5/2020 Aurongzeb
2020/0349586 A1 11/2020 Deng et al.
2020/0379454 A1 12/2020 Trinh
(Continued)

FOREIGN PATENT DOCUMENTS

CN 115878719 A 3/2023
CN 116939158 A 10/2023
CN 116994773 A 11/2023

OTHER PUBLICATIONS

Abu-El-Haija (MixHop: Higher-Order Graph Convolutional Architectures via Sparsified Neighborhood Mixing, arXiv, 2019, 9 pages) (Year: 2019).*

(Continued)

*Primary Examiner* — Oleg Korsak
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for generating multiple different types of new features from a network graph and training a machine learning model using the newly generated features. A server system generates, from electronic communications, a network graph that includes nodes and edges. The server captures snapshots of the network graph that include nodes and edges existing at different time intervals. The system generates, for nodes included in respective snapshots, different types of features that include a neighbor convolution feature for a given node in a given snapshot by compressing node behavior features for neighbor nodes of the given node that are one hop away from the given node within the given snapshot of the network graph. The system trains, using the plurality of different types of features, a machine learning model usable to predict whether unlabeled nodes in the network graph are anomalous.

20 Claims, 12 Drawing Sheets

(56) References Cited

U.S. PATENT DOCUMENTS

| | | | | |
|---|---|---|---|---|
| 2020/0394658 | A1 | 12/2020 | Chen | |
| 2020/0394707 | A1 | 12/2020 | Guo | |
| 2021/0067558 | A1 | 3/2021 | Ni | |
| 2021/0194907 | A1 * | 6/2021 | Bertiger | H04L 63/14 |
| 2021/0241350 | A1 | 8/2021 | Mane | |
| 2021/0248458 | A1 | 8/2021 | Robert-Regol | |
| 2022/0019745 | A1 | 1/2022 | Jin | |
| 2022/0027777 | A1 | 1/2022 | Schmidt | |
| 2022/0044244 | A1 | 2/2022 | Chen | |
| 2022/0078071 | A1 | 3/2022 | Agapitos | |
| 2022/0086147 | A1 | 3/2022 | Chen et al. | |
| 2022/0122083 | A1 | 4/2022 | Lim et al. | |
| 2022/0343329 | A1 | 10/2022 | Wang | |
| 2022/0358289 | A1 | 11/2022 | Chen et al. | |
| 2023/0005122 | A1 | 1/2023 | Peng et al. | |
| 2023/0053182 | A1 | 2/2023 | Bertiger | |
| 2023/0075676 | A1 | 3/2023 | Deng et al. | |
| 2023/0084532 | A1 | 3/2023 | Chen et al. | |
| 2023/0089481 | A1 | 3/2023 | Liu | |
| 2023/0106416 | A1 | 4/2023 | Gupte | |
| 2023/0289610 | A1 | 9/2023 | Verma | |
| 2023/0325630 | A1 | 10/2023 | Wu | |
| 2024/0062041 | A1 | 2/2024 | Choudhary | |
| 2024/0062058 | A1 | 2/2024 | Fathony | |
| 2024/0303662 | A1 | 9/2024 | Shah | |
| 2024/0330679 | A1 | 10/2024 | Luo | |
| 2025/0029000 | A1 * | 1/2025 | Dong | G06N 3/08 |

OTHER PUBLICATIONS

Akcora et al., "BitcoinHeist: Topological Data Analysis for Ransomware Detection on the Bitcoin Blockchain," arXiv:1906.07852v1 [cs.CR] Jun. 19, 2019, 15 pages.

* cited by examiner

Example Bi-partite Network Graph 412

Input Edge(s) 404

Total Degree 406

Electronic Communication Interval 402

Entity 410A

Output Edge(s) 408

Total Inflow 422

Entity 410B

Electronic Communication 420

Entity 410C

Method 800

Generate, from a plurality of electronic communications, a network graph that includes a plurality of nodes and edges.
810

Capture a plurality of snapshots of the network graph, wherein the plurality of snapshots include nodes and edges existing at a plurality of different time intervals.
820

Generate, for nodes included in respective snapshots of the plurality of snapshots, a plurality of different types of features, including generating a neighbor convolution feature for a given node in a given snapshot.
830

Compress a plurality of node behavioral features for one or more neighbor nodes of the given node, where the one or more neighbor nodes are one hop away from the given node within the given snapshot of the network graph.
840

Train, using the plurality of different types of features, a machine learning model, where the trained machine learning model is usable to predict whether one or more unlabeled nodes in the network graph are anomalous.
850

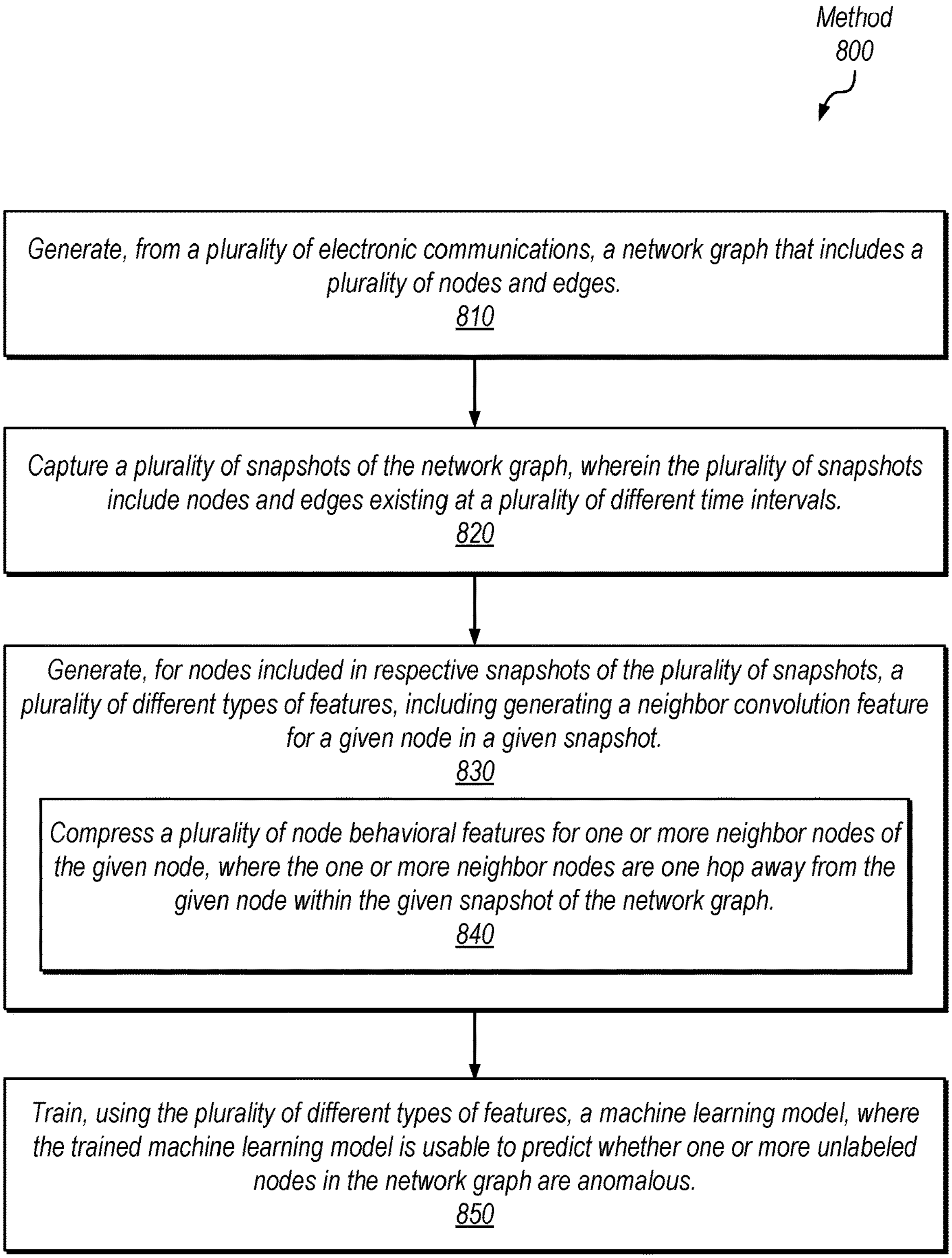

Fig. 8

Method
900

Access a machine learning model trained using a plurality of different features generated using two or more feature extraction procedures.
910

Determine, using the machine learning model, labels for one or more unlabeled nodes in a network graph whose nodes correspond to different entities and whose edges correspond to different electronic communications executed between the different entities, where the determining is performed based on output of the machine learning model for values of the plurality of different features corresponding to the one or more unlabeled nodes.
920

Update, based on the determining, the network graph, where the updating includes assigning the determined labels to the one or more unlabeled nodes in the network graph.
930

Perform one or more preventative actions for one or more entities corresponding to the one or more nodes with the assigned labels, where the one or more preventative actions are performed based on the assigned labels indicating that behavior of entities corresponding to the one or more nodes are anomalous.
940

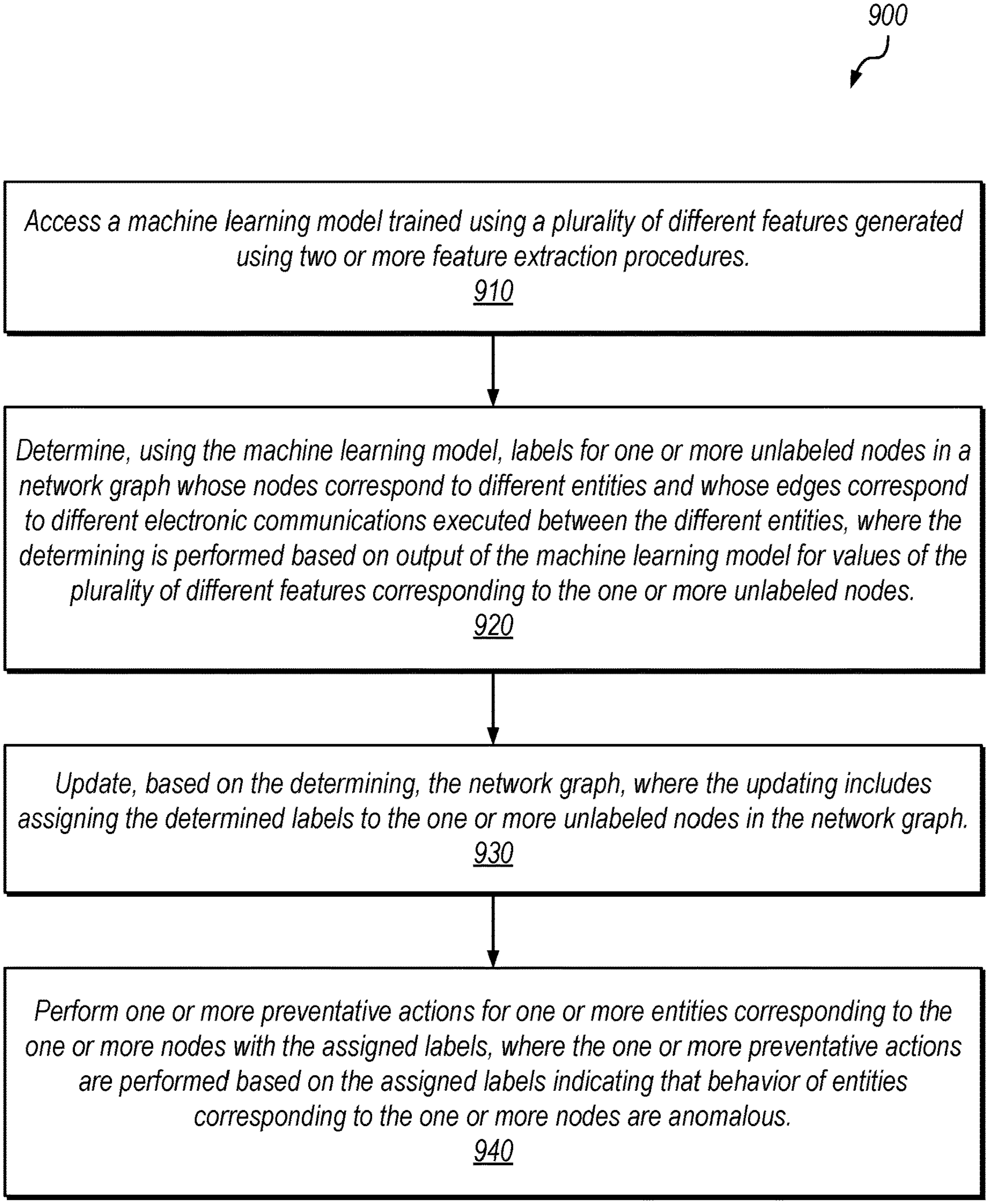

*Fig. 9*

FEATURE EXTRACTION TECHNIQUES

CROSS-REFERENCE TO RELATED APPLICATIONS

This application shares a specification with the concurrently filed U.S. application Ser. No. 18/356,783 titled "Label and Network Graph Expansion Using Multiple Feature Extraction Procedures."

BACKGROUND

Technical Field

This disclosure relates generally to feature processing, and, more specifically, to techniques for generating features, for example, for use in machine learning training.

Description of the Related Art

As more and more systems begin using machine learning to process big data, the features available to train machine learning models become more and more complex. In many situations, machine learning models are trained on features for a variety of different applications, such as analysis, risk detection, diagnostics, classification, pattern recognition, etc. In order to train on different types of data, different features may be generated prior to training machine learning models. Often, traditional features do not reveal the relationship between different entities participating in electronic communications together. As such, training and updating machine learning models based on traditional features may impair analyses performed by data processing systems utilizing machine learning models trained using traditional features due to the models being outdated.

Many communication requests (one example of the data that may be processed) may be submitted with malicious intent, often resulting in wasted computer resources, network bandwidth, storage, CPU processing, etc. In this example, such computing resources may be wasted if the communications are processed based on inaccurate predictions performed by machine learning models that are outdated due to the use of limited, traditional features to train and update these models. For example, an outdated machine learning model may inaccurately predict that a communication request is not suspicious, causing the communication to be processed (even though it is indeed suspicious) which often results in both computational and monetary loss.

BRIEF DESCRIPTION OF THE DRAWINGS

FIG. 8 is a flow diagram illustrating a method for generating multiple different types of new features from a network graph and training a machine learning model using the new features, according to some embodiments.

FIG. 9 is a flow diagram illustrating a method for maintaining a network graph by updating labels in the graph based on features generated using at least two different feature extraction procedures, according to some embodiments.

DETAILED DESCRIPTION

Figure 1:
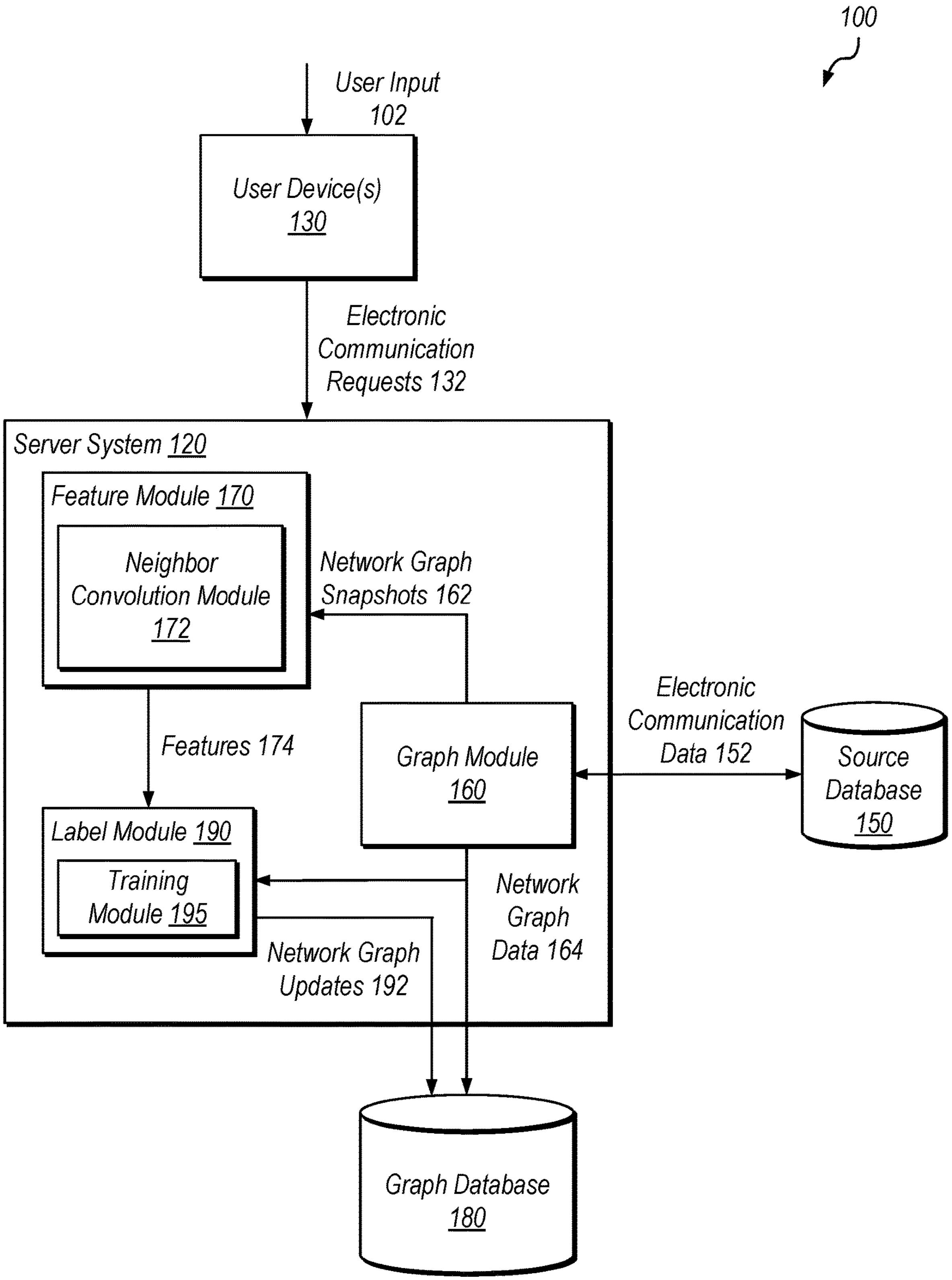
FIG. 1 is a block diagram illustrating an example system configured to generate neighbor convolution features from snapshots of a network graph, according to some embodiments.

Traditionally, electronic communications processing systems evaluate a set of known entities (e.g., known to be anomalous in some way) to identify other entities that are close to the set of known entities within an electronic communication network graph. For example, if an unknown entity is within one communication hop of a known entity included in the set of known entities, then the system will identify the unknown entity as suspicious (e.g., due to its proximity to a known suspicious account). Such techniques, however, may not account for the behavior of the unknown entity itself, but rather may simply observe whether the given entity is in proximity to a known anomalous entity. Implementation of these traditional techniques may lead to various anomalous entities (e.g., suspicious, and potentially fraudulent, accounts) going unidentified (e.g., particularly accounts that are more than a single hop away from a known suspicious account) as well as misidentification of entities as anomalous (when they are not actually anomalous). In disclosed techniques an electronic communication network graph is made up of nodes (points in the graph) representing entities and edges (lines between the nodes) representing the communications (interactions) between entities.

To address these shortcomings, the disclosed techniques measure the similarity in behavior between a given entity (e.g., wallet or account) and one or more other entities based on proximity of those entities within an electronic communication network graph. Further, the disclosed techniques determine the distance between these entities within the network graph and, based on their similarity and proximity, assign a label to the given entity based on known labels already assigned to the other entities that are similar or in close proximity to the given entity. Based on the determines behavior similarity and proximity data, the disclosed techniques generate features for training machine learning models to classify (or reclassify misclassified) entities. Such feature extraction techniques generate node behavior features (e.g., features that indicate general behaviors of entities, such as the total payment volume in the context of electronic transactions), neighbor convolution features (e.g., features generated by performing independent component analysis on compressed node behavior features for neighbor nodes of a given node being evaluated), and community diffusion features (e.g., features that indicate whether and where a node representing an entity is located in an anomalous community within the network graph, the given node corresponding to the community diffusion feature being calculated).

In contrast to traditional techniques, the disclosed techniques include automated methods for extracting new features for nodes of a network graph to allow for identification of behavior patterns of various entities within the network graph. Such techniques allow for accurate identification of anomalous entities (e.g., suspicious wallets or accounts) by using the newly extracted features to train a machine learning model whose output may be used in combination with proximity data of nodes within a network graph to determine whether an entity is anomalous. Further, the disclosed techniques use the newly extracted features to train a machine learning model to predict anomalies in different entities (that are either labeled or unlabeled). Based on the predictions output by the trained machine learning model, labels are either assigned to the entities or the currently assigned, inaccurate labels are replaced with accurate labels. The network graph is then updated with the newly assigned labels. In some embodiments, preventative actions (e.g., blocking wallets from performing future transactions) are performed against entities that have newly been labeled as anomalous.

The disclosed techniques may advantageously provide for generation of new types of features that previously were not available for machine learning training and anomaly prediction. Further, the use of the disclosed different types of features may advantageously allow for replacement of mislabeled nodes in a network graph used to generate future features, which, in turn, may improve the accuracy of future labels propagation for the electronic communication network graph. The generation of features for nodes in snapshots of a network graph may advantageously allow for evaluation of anomalies in different entities at different windows of time (e.g., an entity exhibiting anomalous behavior during a first 24-hour window of time may not be exhibiting anomalous behavior during a second, later 24-hour time window and the disclosed feature generation techniques will reveal this behavior). The generation of new types of features provided by the disclosed techniques may, in turn, advantageously allow for training and updating of machine learning models for use in predicting risk e.g., of various requested electronic communications. In this example, such techniques may advantageously allow electronic communication processing systems to quickly analyze electronic communication data to identify problematic suspicious behavior and, thereby, mitigate potential future suspicious (and potentially fraudulent) behavior. For example, an electronic communication processing system may identify that a given server in a network of servers is down and, therefore, is causing problems in electronic transmissions between the different servers of the network of servers, such as dropping packets or delaying transmissions altogether. In this example, because the disclosed techniques generate and evaluate communications using community-related features, problematic communications between a network of servers are easily identified and mitigated. Such techniques may advantageously decrease the amount of computer resources necessary to perform feature queries as well as decreasing loss (e.g., financial, user trust, etc.) associated with problematic or suspicious electronic communications.

Example Feature Generation System

FIG. 1 is a block diagram illustrating an example system configured to generate neighbor convolution features from snapshots of a network graph. In the illustrated embodiment, system 100 includes user device(s) 130, source database 150, graph database 180, and server system 120, which in turn includes graph module 160, feature module 170, and label module 190.

In the illustrated embodiment, one or more user devices 130 receive user input 102 from users and based on this input transmit one or more electronic communication requests 132 to server system 120. For example, the electronic communication requests 132 may be requests for transmission of data between servers of a network of servers, text messages, electronic transactions (e.g., a person-to-person transaction), etc. Based on such requests, server system 120 gathers and stores electronic communication data 152 in source database 150. Such electronic communication data 152 may include source attributes indicating entities (e.g., user, businesses, etc.) involved in the communications, types of information being communicated between entities, amounts of data being communicated (e.g., a transaction amount), etc. Source database 150 may be implemented as a relational or non-relational database. For example, source database 150 may be a relational database including tables storing electronic communication data in columns with rows corresponding to different electronic communications. These tables may store values for various electronic communication attributes including one or more of the following types of attributes: user account identifier (ID), internet protocol (IP) address, wallet identifier, timestamp, transaction amount, communication type, communication frequency, etc.

In some embodiments, server system 120 is a transaction processing system that stores electronic transactions and ground-truth examples (e.g., known labels collected from different sources) in source database 150. The ground truth examples may include transactions that are known to be either anomalous (e.g., suspicious) or not anomalous and are labeled by server system 120 accordingly. The ground truth examples may be collected from multiple sources including one or more of the following sources: a treasury list (e.g., the U.S. Treasury Office of Foreign Assets Control (OFAC) list), crowdsourced platforms (e.g., Patreon™, Kickstarter™, GoFundMe™, etc.), a wallet explorer (e.g., on blockchain), etc.

Server system 120, in the illustrated embodiment, retrieves electronic communication data 152 for a plurality of different electronic communication requests 132 from source database 150. Server system 120 inputs the electronic communication data 152 into graph module 160. Graph module 160 generates a network graph 112 based on the electronic communication data 152. For example, graph module 160 may generate a network graph 112 that includes nodes representing entities and edges representing the electronic communications that occurred between the entities, where thicker, more dense edges indicate a large number of communications between a pair of entities. In some situations, the network graph 112 generated by graph module 160 is a bi-partite network graph that includes nodes that represent both entities and electronic communications and edges connecting the nodes that represent the interactions between the entities. As one specific example, a bi-partite network graph includes a first node that represents a user wallet and a second node that is connected to the first node that represents a transaction requested by the user of the user wallet. In this specific example, the second node, in turn, is connected to a third node representing a second, different user wallet with which the first user wallet is attempting to transact. Example network graphs are discussed in further detail below with reference to FIGS. 2B, 2C, and 4.

Graph module 160, in the illustrated embodiment, generates snapshots 162 of a network graph 112 based on different time intervals and transmits snapshots 162 to feature module 170. For example, graph module 160 generates a given snapshot 162 by including only those electronic communications (and entities participating in those communications) that occurred within an interval of time in the given snapshot. For example, a time interval may be a minute, an hour, a day, a week, etc. As one specific example, snapshots 162 of network graph 112 may be generated for several consecutive 24-hour time intervals. In addition to sending snapshots 162 to feature module 170, graph module 160 stores network graph data 164 in graph database 180. The network graph data 164 may include network graph 112 (e.g., a bi-partite transaction network graph, such as the blown-up version of network graph 212 shown in FIG. 2B), snapshots 162 of network graph 112, and electronic communication data 152, for respective nodes in the overall network graph. Graph module 160 also sends network graph data 164 to label module 190.

Feature module 170, in the illustrated embodiment, receives snapshots 162 of network graph 112 from graph module 160 and generates a plurality of features 174 based on the snapshots. For example, feature module 170 executes one or more feature extraction procedures to calculate new features based on the snapshots 162. In the illustrated embodiment, feature module 170 includes neighbor convolution module 172, which executes a neighbor convolution feature extraction procedure to generate neighbor convolution features. A neighbor convolution feature for a given node quantifies the behavior of the given node based on the behavior patterns (e.g., features or attributes) of its neighboring nodes within a transaction network graph.

In some embodiments, feature module 170 includes a plurality of different feature extraction modules operable to generate different types of features. For example, the different feature modules may be operable to perform feature extraction procedures including one or more of the following feature extraction procedures: node behavior feature extraction, neighbor convolution feature extraction, and community diffusion feature extraction. These feature extraction procedures are discussed in further detail below with reference to FIGS. 3-6. In some situations, feature extraction procedures may also include feature preprocessing, such as filtering (e.g., Pearson correlation, chi-squared, etc.), wrapper-based (e.g., recursive feature elimination), embedding (e.g., Lasso, random forest, etc.), or any combination thereof.

In some embodiments, server system 120 stores features 174 in graph database 180 in addition to network graph data 164. In such embodiments, graph database 180 may be implemented as a relational database storing tables with various columns for different features 174. For example, graph database 180 may store one or more of the following types of features calculated using the disclosed feature extraction procedures: node behavior features, neighbor convolution features, and community diffusion features.

Label module 190, in the illustrated embodiment, receives features 174 from feature module 170 and trains, using training module 195, one or more machine learning models, as discussed in further detail below with reference to FIG. 7. For example, feature module 170 may provide a set of features (e.g., features 174) generated from electronic communication source data 152 for use in training (or updating) a machine learning model to detect whether one or more future electronic communications are risky (and potentially malicious) in order to determine whether to approve future electronic communications. In some embodiments, based on predictions output by a trained machine learning model for nodes in a network graph generated by graph module 160 and stored in graph database 180, label module 190 sends updates 192 for the network graph 112 to graph database 180. For example, updates 192 may include new labels for nodes in the network graph (to label unlabeled nodes or to replace existing labels for labeled nodes in the network graph). In some embodiments, label module 190 sends updates 192 to graph module 160, which in turn executes such updates on the network graph 112 stored in graph database 180.

In this disclosure, various "modules" operable to perform designated functions are shown in the figures and described in detail (e.g., graph module 160, feature module 170, label module 190, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Graph Module

Figure 2A:
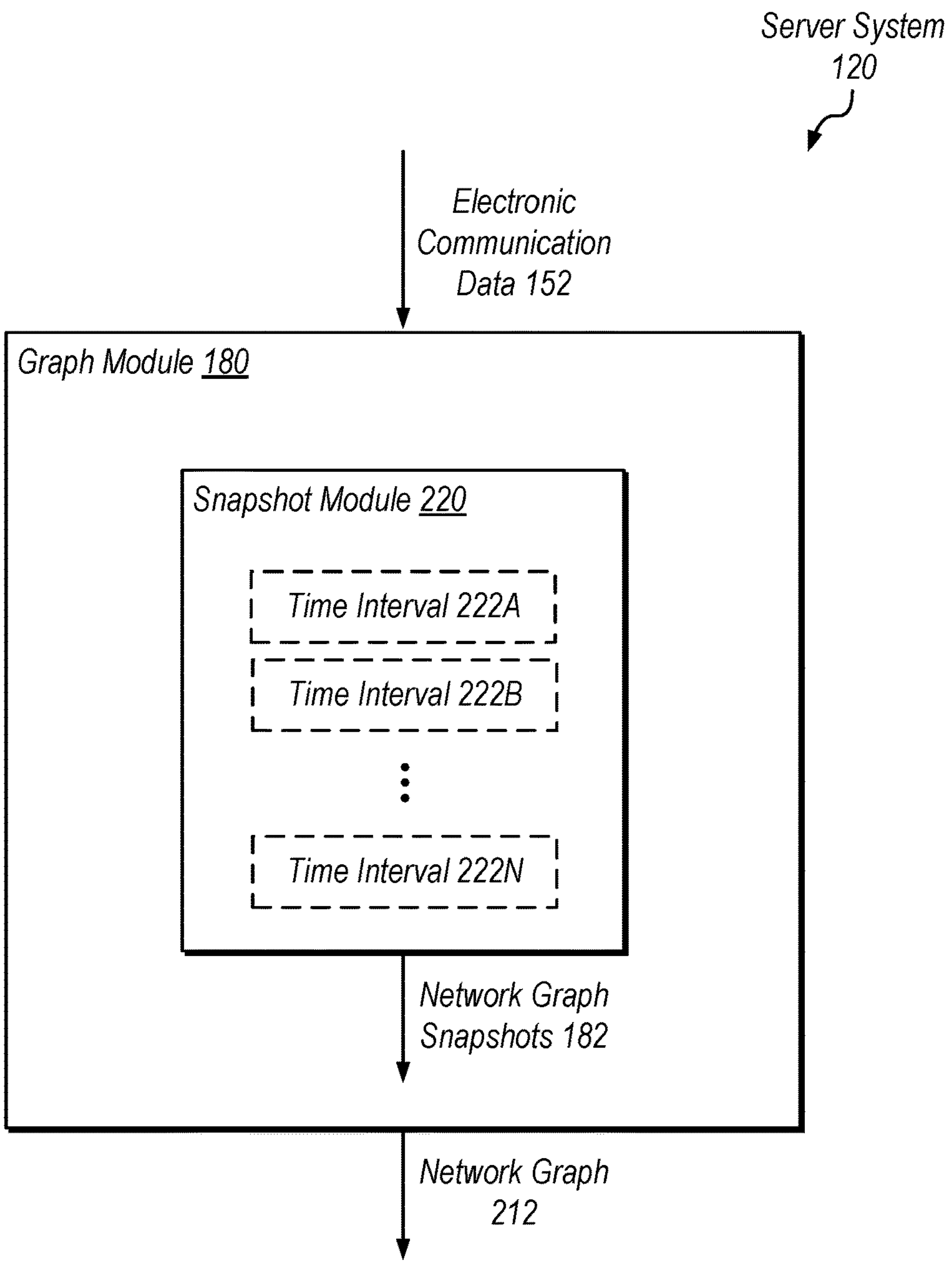
FIG. 2A is a block diagram illustrating an example graph module, according to some embodiments.

FIG. 2A is a block diagram illustrating an example graph module. In the illustrated embodiment, server system 120 includes graph module 160, which in turn includes snapshot module 220. Graph module 160 uses electronic communication data 152 to generate and output a network graph 112. In some embodiments, network graph 112 is implemented as a bi-partite network graph. For example, network graph 212 may include nodes representing both entities (e.g., servers, users, user wallets, user accounts, etc.) and the communications in which the entities have participated (e.g., server transmissions, electronic transactions, etc.). In other embodiments, network graph 112 is implemented as a non-bi-partite graph that include nodes representing entities (and does not include nodes electronic communications between the entities) and edges representing the electronic communications between the entities, as shown in the example network graph 512 discussed in further detail below with reference to FIG. 5.

Graph module 160, in the illustrated embodiment, receives electronic communication data 152 and generates a network graph 112 based on the electronic communication data 152. In some embodiments, graph module 160 executes snapshot module 220 to generate a plurality of snapshots 182 of network graph 112 based on a plurality of different time intervals and outputs these snapshots 182 in addition to network graph 112. Snapshot module 220 generates snapshots 182 of a network graph based on time intervals 222A-222N and electronic communication data 152. For example, snapshot module 220 first divides the electronic communications included in data 152 into 24-hour time windows based on their timestamps (e.g., indicating the time at which the communications were initiated). Then, for each time window, snapshot module 220 constructs a network graph that includes the electronic communications occurring within the corresponding time window. In some embodiments, time intervals 222A-222N are the same length of time (e.g., 24 hours). In other embodiments, time intervals 222A-222N are different lengths (e.g., one is 12 hours, one is 14 hours, another is 24 hours, etc.). In various embodiments, the different time intervals 222A-222N occur consecutively. For example, a 24-hour time interval from 8:01

AM Jun. 28, 2023 to 8:00 AM Jun. 29, 2023 is just prior to a second, different 24-hour time interval that is from 8:01 AM Jun. 29, 2023 to 8:00 AM Jun. 30, 2023.

Figure 2B:
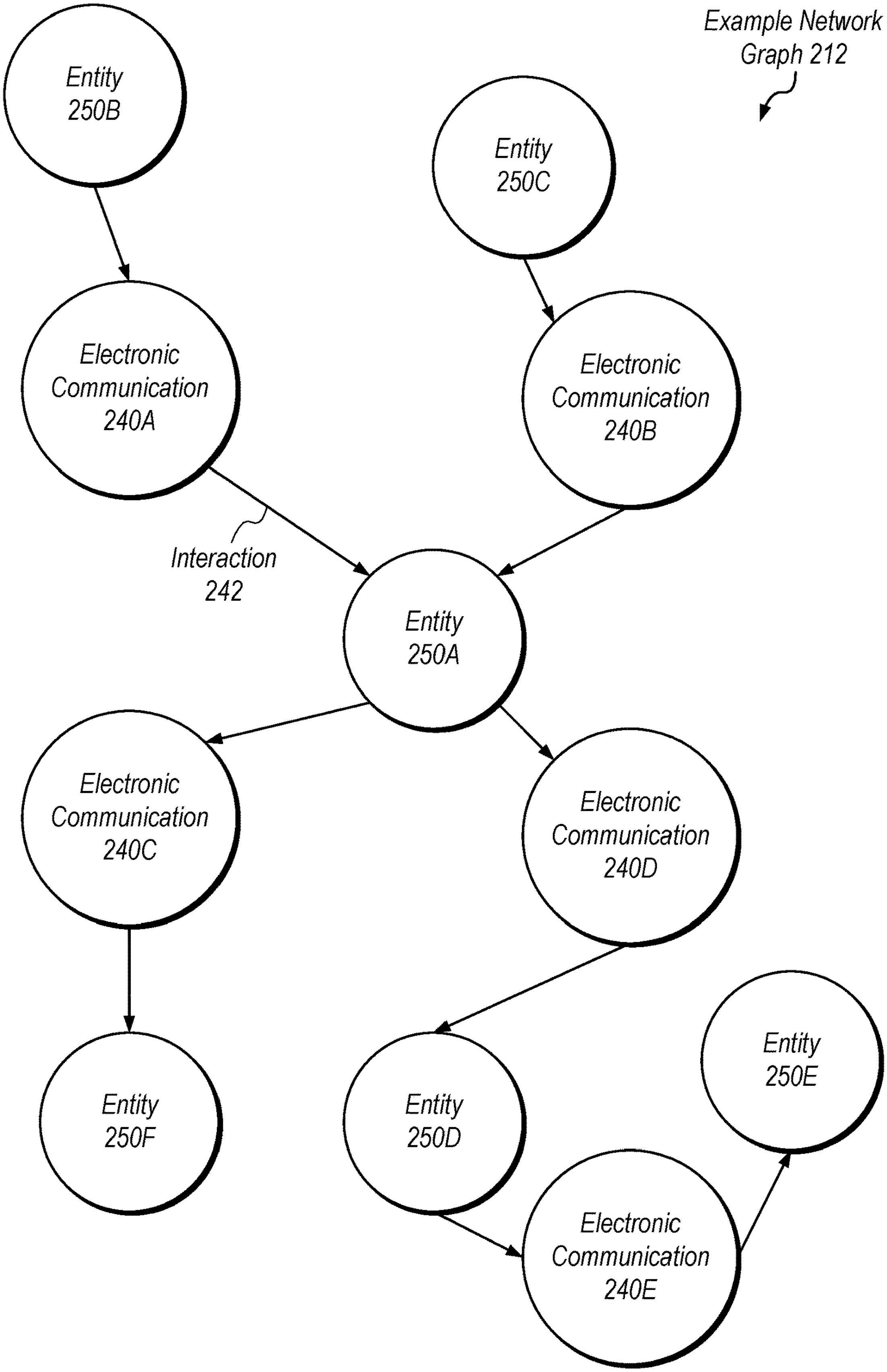
FIGS. 2B and 2C are diagrams illustrating an example bi-partite network graph and an example snapshot of the bi-partite network graph, respectively, according to some embodiments.
Figure 2C:
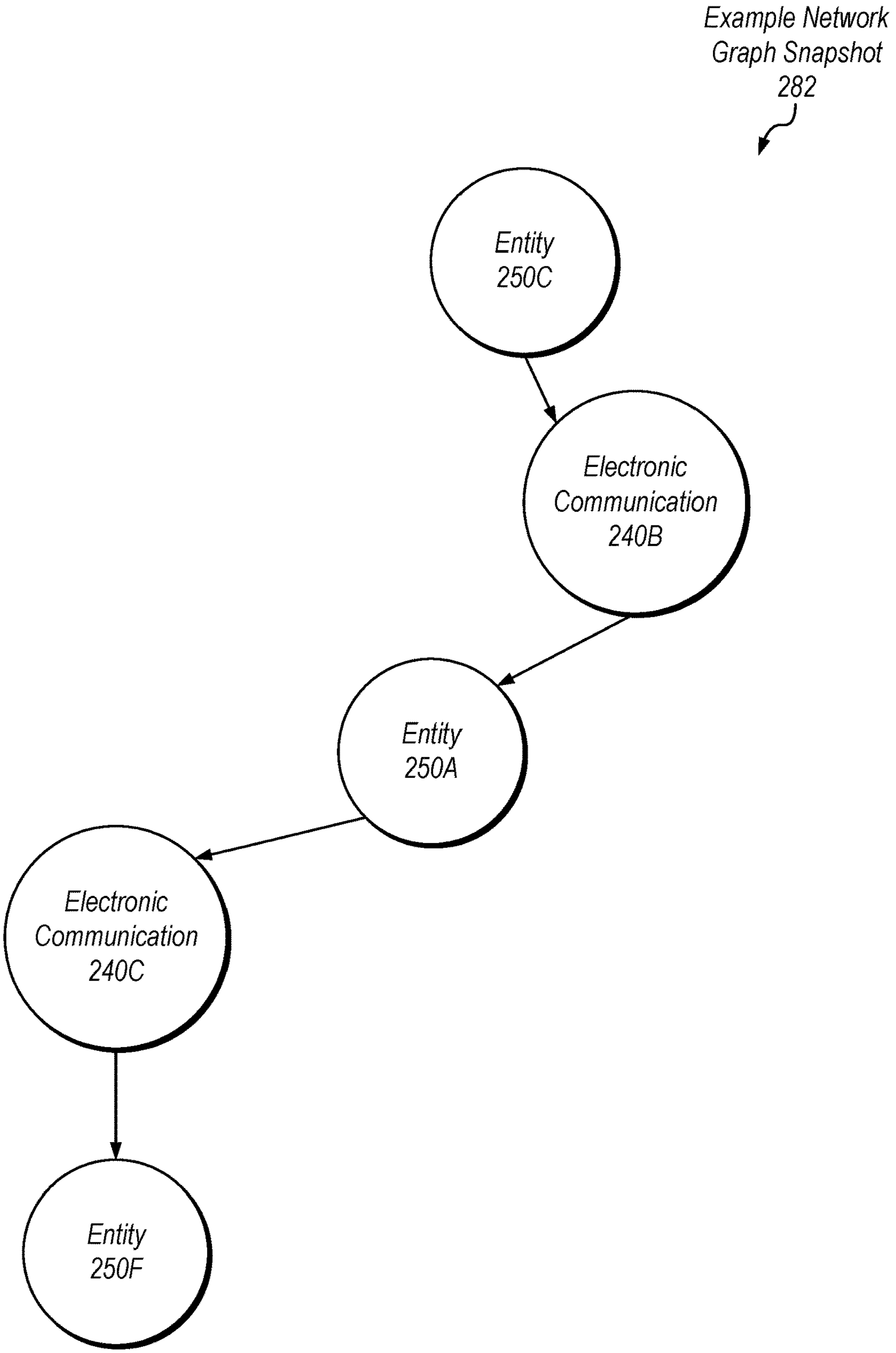

Turning now to FIGS. 2B and 2C, diagrams illustrating an example bi-partite network graph and an example snapshot of the bi-partite network graph, respectively. In FIG. 2B, an example network graph 212 that is a bi-partite network graph (one example of network graph 112 shown in FIG. 1) generated by graph module 160 is shown. The network graph 212 shown in FIG. 2B includes nodes representing both entities 250A-250F and electronic communications 240A-240E. In the bi-partite network graph example shown in FIG. 2B, the edges between electronic communication 240A and entity 250A is labeled as interaction 242. In this example, the edge represents the interaction 242 between entity 250B and entity 250A (e.g., $100 is being transferred from entity 250B to entity 250A as part of electronic communication 240A. In other examples, network graph 212 may be a non-bi-partite network graph that includes nodes representing only entities (and does not include nodes representing the communications between the entities).

In FIG. 2C, an example snapshot 282 of network graph 212 is shown. For example, the snapshot includes only electronic communications 240B and 240C that occurred within a given time interval and the entities 250A, 250C, and 250F between which these electronic communications occurred. As one specific example, snapshot 282 includes electronic communications occurring within a given 12-hour time interval.

Example Feature Generation

Figure 3:
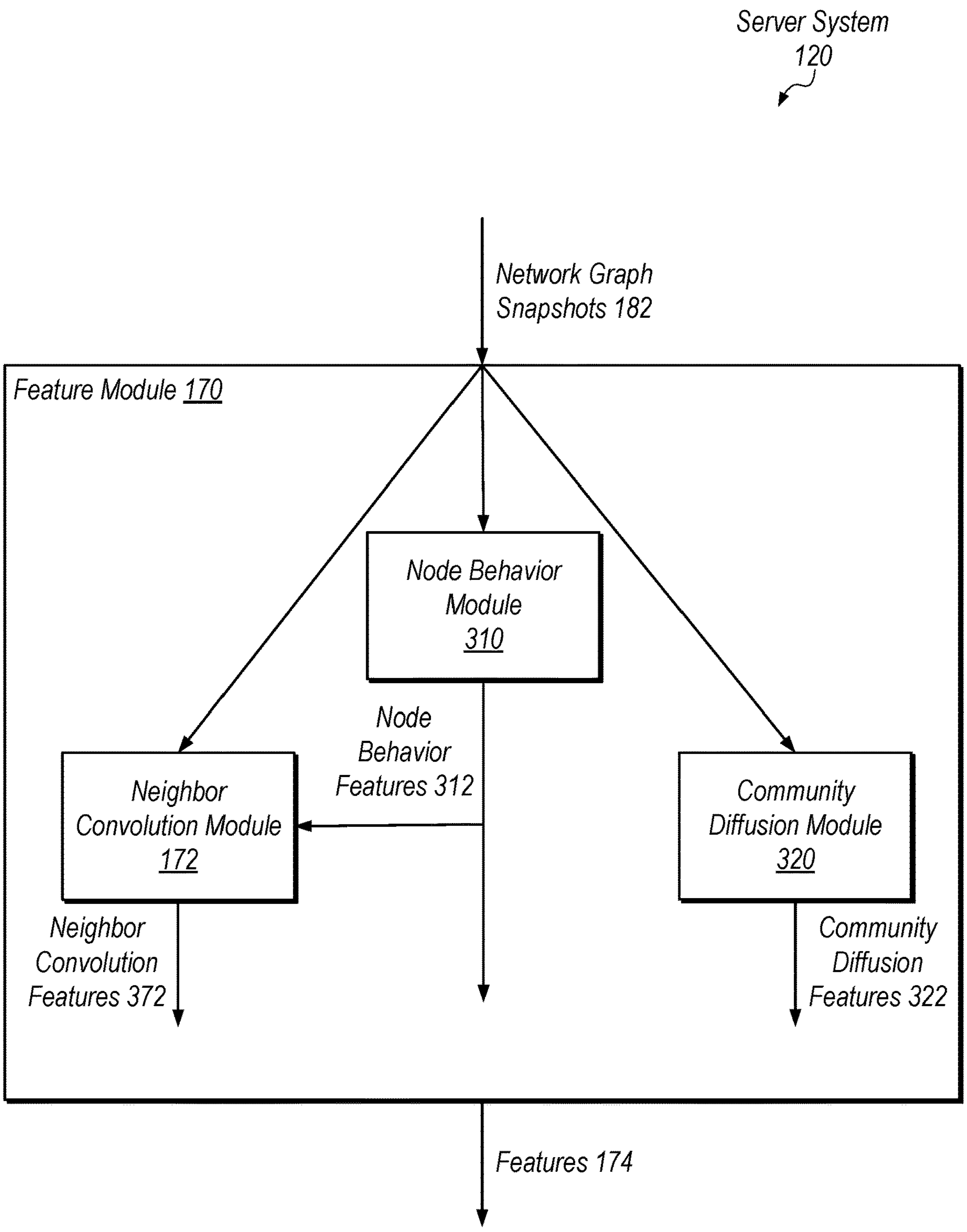
FIG. 3 is a block diagram illustrating an example feature module, according to some embodiments.

FIG. 3 is a block diagram illustrating an example feature module. In the illustrated embodiment, feature module 170 includes neighbor convolution module 172, node behavior module 310, and community diffusion module 320. Feature module 170, in the illustrated embodiment, receives snapshots 182 and inputs the snapshots into the neighbor convolution module 172, node behavior module 310, and community diffusion module 320. Feature module 170 outputs a set of features 174 that include node behavior features 312, neighbor convolution features 372, and community diffusion features 322.

Node behavior module 310, in the illustrated embodiment, generates node behavior features 312 for nodes in the respective snapshots 182. For example, for a given node included in a given snapshot 182, node behavior module 310 generates one or more of the following node behavior features: an in-degree (e.g., the number of edges pointing into the node indicating the number of interactions in which the entity corresponding to the node is the receiving entity (the receiving wallet)), out-degree (e.g., the number of edges point out from the node, indicating the number of interactions in which the entity corresponding to the node is the sending entity (the sending wallet)), total degree (e.g., the total number of edges connected to this node, indicating the total number of interactions in which this entity has participated), inflow (including minimum, maximum, mean, median, etc. inflow such as the dollar amount that is coming into a wallet represented by the node), outflow (including minimum, maximum, mean, median, total, etc. outflow such as the dollar amount that is going out from the wallet represented by the node), change of balance (e.g., the dollar amount the wallet has changed during the 24-hour time window), edge duration (including input, output, total, etc. duration for a given node such as the amount of time between when an electronic transaction is initiated and when it is completed), time interval between edges (including minimum, maximum, mean, median, total, etc. such as the amount of time between completion of a first electronic transaction initiated at a given node and a second, different electronic transaction initiated at the given node), etc. Node behavior module 310 outputs node behavior features 312, including sending the node behavior features 312 to neighbor convolution module 172. Example node behavior features 312 are discussed in further detail below with reference to FIG. 4.

Neighbor convolution module 172, in the illustrated embodiment, generates neighbor convolution features 372 based on snapshots 182 and node behavior features 312. For example, neighbor convolution module 172 generates neighbor convolution features 372 for a given node according to a homophily assumption that features or labels of the given node are similar to its neighbor nodes. For example, neighbor convolution features 372 for a given node are determined by aggregating and transforming features (e.g., node behavior features) of its neighbor nodes. As one specific example, wallets that have interacted closely with one another (e.g., have conducted multiple electronic transactions) share related behavior or intention (e.g., malicious behavior or intention). In this specific example, even if a wallet corresponding to a given node does not exhibit behaviors typically associated with suspicious activity, if the neighboring nodes of the given node are exhibiting anomalous behavior then it is likely that the given node is also a suspicious entity. Leveraging features of neighboring nodes may advantageously allow for more accurate classification of a given target node relative to techniques that use e.g., only node behavior features.

Community diffusion module 320, in the illustrated embodiment, receives snapshots 182 and generates community diffusion features 322. Similar to neighbor convolution module 172, community diffusion module 320 operates according to the homophily assumption that a given node that connects with nodes (one, two, three, etc. hops away) in the network graph that are known to be exhibiting anomalous behavior is likely also anomalous. In addition to the homophily assumption under which neighbor convolution module operates, however, community diffusion module 320 identifies the relationship between a given node and its local node community as a whole. For example, community diffusion module 320 gathers and encodes features for one or more nodes that are located in a community with a given node to identify one or more of the following: whether the given node is in a community of nodes formed by anomalous nodes (e.g., a wallet could belong to a community of known suspicious wallets), the distance between the given wallet and one or more center nodes of the community, and a connectivity density of edges between the given node and one or more known anomalous (or not anomalous) nodes.

Community diffusion module 320 determines, for example, that if a given node is located in a community of nodes that are known to be anomalous, then the given node is likely anomalous. Further in this example, if a node is located at a short distance from the "center" of a known anomalous community, then the given node is likely anomalous. In contrast, in this example, if the given node is located at the "border" of a known anomalous community of nodes in the snapshot, community diffusion module 320 may determine that the given node is not anomalous. Still further in this example, if the connectivity density of edges between the given node and one or more known anomalous nodes is higher than a predetermined threshold connectivity density, community diffusion module 320 determines that the given node is likely anomalous. As discussed in further detail below with reference to FIG. 6, community diffusion module 320 determines scores for different nodes within a community of nodes in a snapshot of a network graph (and propagates labels based on these scores) by generating various matrices based on different pairs of nodes within the community of nodes.

Figure 4:
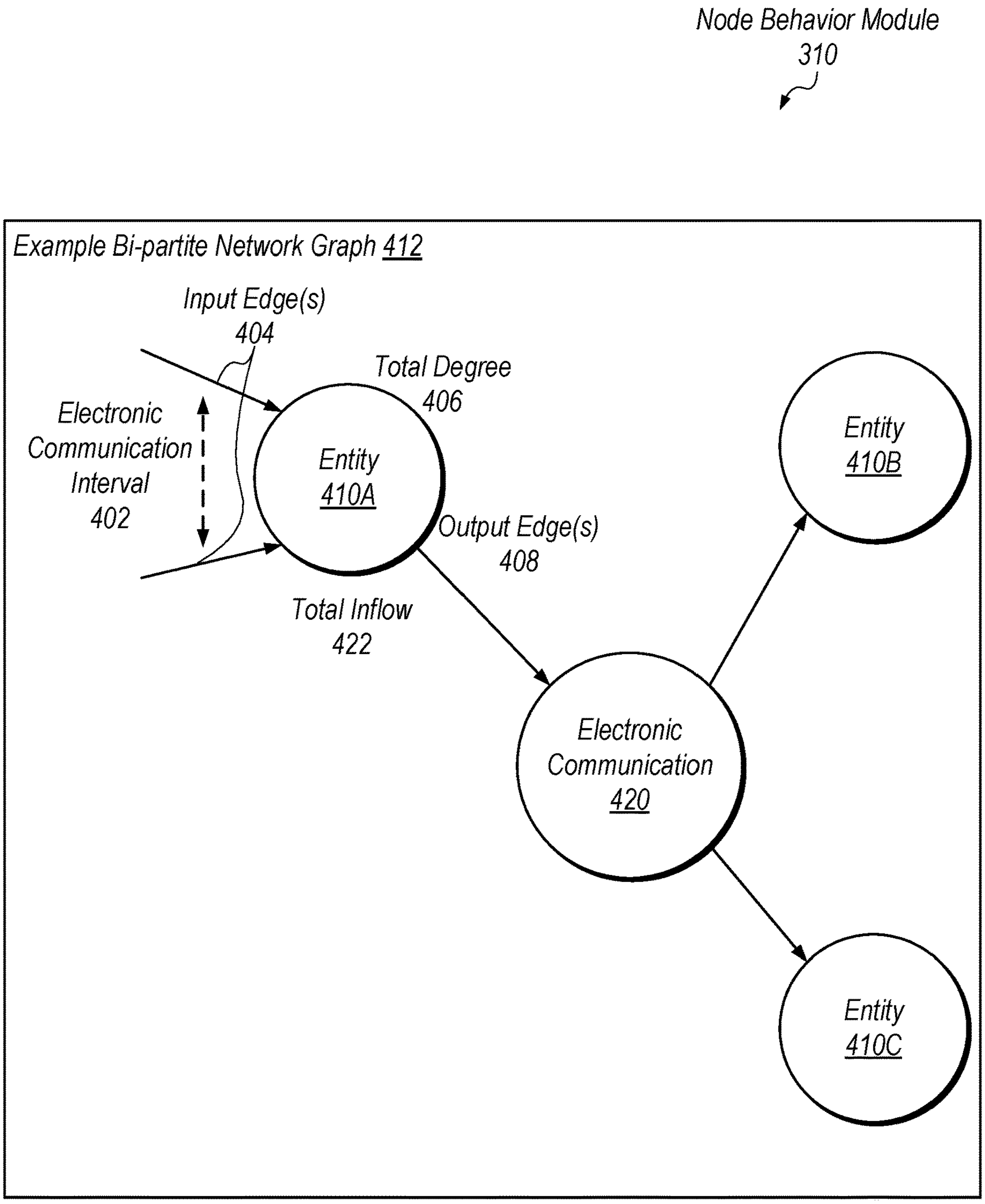
FIG. 4 is a diagram illustrating example node behavior features of a given entity represented by a node of an example bi-partite network graph, according to some embodiments.

In FIG. 4, a block diagram is shown illustrating example node behavior features of a given entity represented by a node of an example bi-partite network graph. In the illustrated embodiment, an example bi-partite network graph 412 is shown with example node behavior features 312 generated by the node behavior module 310, shown in FIG. 3, for a given node, entity 410A. In some embodiments, example bi-partite network graph 412 is a snapshot of a network graph generated based on a 24-hour time interval. Example bi-partite network graph 412 includes four different nodes: entity 410A, entity 410B, entity 410C, and electronic communication 420 (e.g., an electronic transaction in which all three entities 410A-410C are participating). In bi-partite network graph 412, entity 410A participates in an electronic communication 420 e.g., by transmitting money from a wallet of entity 410A to one or more of entity 410B and entity 410C. In some situations, entity 410A participates in an electronic communication 420 with only one other entity (e.g., entity 410B).

In the illustrated embodiment, several different node behavior features 312 are shown for entity 410A. For example, node behavior module 310 determines an electronic interval 402 feature for entity 410A based on the amount of time between initiation of two different electronic communications (represented by the two input edges 404) in which entity 410A is the recipient entity. For example, interval 402 may be three hours. Similarly, node behavior module 310 determines a total degree 406 feature for entity 410A node to be three. In this example, the total degree 406 feature of three indicates that this entity 410A has initiated (or completed) three electronic communications e.g., in the past 24 hours. Node behavior module 310 further generates an output edge 408 feature for entity 410A by determining that the total number of outgoing electronic communication (e.g., transactions in which entity 410A is the sending wallet) for this node is one. Further, node behavior module 310 generates a total inflow 422 feature for entity 410A node by determining that e.g., the total dollar amount of electronic transactions in which entity 410A is the recipient entity is $1000.

Figure 5:
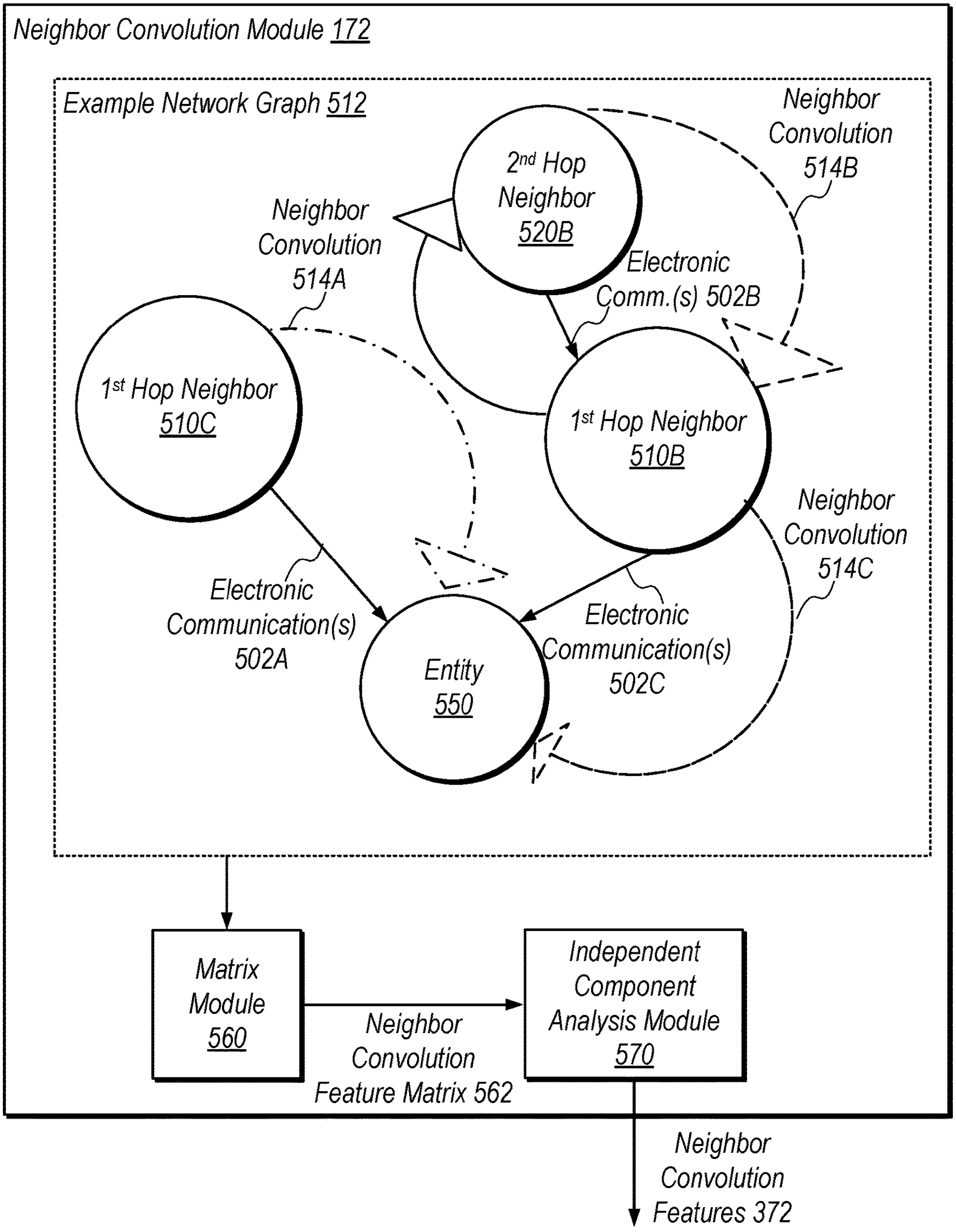
FIG. 5 is a block diagram illustrating an example neighbor convolution module, according to some embodiments.

FIG. 5 is a block diagram illustrating an example neighbor convolution module. In the illustrated embodiment, neighbor convolution module 172 includes an example network graph 512, matrix module 560, and independent component analysis module 570. In some embodiments, example network graph 512 is a snapshot of a network graph. Neighbor convolution module 172 executes matrix module 560 and independent component analysis module 570 to generate and output neighbor convolution features 372 for entity 550 based on node behavior features of various neighbor nodes of entity 550 included in example network graph 512. Various electronic communications 502A, 502B, and 502C are shown in the example network graph 512 between the different nodes (entity 550, $1^{st}$ hop neighbor nodes 510B and 510C, and $2^{nd}$ hop neighbor node 520B) of the graph. In addition, various neighbor convolutions 514A, 514B, and 514C (e.g., relationships between nodes of network graph 512) are shown via arcs in FIG. 5.

Neighbor convolution module 172, in the illustrated embodiment, inputs example network graph 512, which may include node behavior features 312 for nodes 550, 510B, 510C, and 520B, into matrix module 560. Matrix module 560 generates a neighbor convolution feature matrix 562 based on the node behavior features 312 for the different nodes in network graph 512. The values of these matrices are the values of neighbor convolution features. For example, matrix module 560 performs a matrix operation on node behavior features for neighbor nodes of entity 550 that are one hop away from entity 550 in network graph 512. In the example of FIG. 5, matrix module 560 generates a matrix based on the node behavior features 312 of 1st hop neighbor nodes 510B and 510C.

In order to generate neighbor convolution features for entity 550 based on 1st hop neighbor nodes, neighbor convolution module 172 generates an adjacency matrix, A, of size N×N (where N is the number of nodes in the network graph 512) that indicates, for different pairs of nodes (e.g., for 550 and 510B, and for 550 and 510C, respectively), whether the different pairs of nodes are connected to one another in the network graph via one or more edges. For example, if an entry for column one (entity 550) and row two ($1^{st}$ hop neighbor node 510C) of the adjacency matrix has a non-zero value, this indicates that there is an edge (representing one or more electronic communications) between these two nodes within the network graph 512. For example, the value in adjacency matrix for neighbor node 510C is a four based on the weight of the edge between node 510C and entity 550 being four (i.e., entity 550 and node 510C have completed four different electronic communications 502A). In other embodiments, the values stored in the adjacency matrix indicate the total dollar amount for electronic transactions completed between respective pairs of entities. For example, if the total dollar amount for electronic communications 502A between entity 550 and neighbor node 510C is $100, then the value stored in the matrix for the entry corresponding to entity 550 and neighbor node 510C is 100. The adjacency matrix may include values for both $1^{st}$ hop and $2^{nd}$ hop neighbor nodes in order to generate neighbor convolution features for entity 550 based on multiple neighboring nodes within network graph 512.

After generating the adjacency matrix, A, for nodes in network graph 512, neighbor convolution module 172 generates an identity matrix which is a diagonal matrix that includes values of one along its diagonal that indicate whether nodes in the graph have an edge that loops back to themselves. For example, within the identity matrix, column one (which represents entity 550 node) and row one (which also represents entity 550 node) might have a value of one. The following is an example of an identity matrix, A, which is a 3×3 identity matrix (the number of nodes in the network graph in this example is 3) generated for network graph 512 to be used by neighbor convolution module 172 to generate neighbor convolution features:

$$\text{Identity Matrix } I_3 = \begin{bmatrix} 1 & 0 & 0 \\ 0 & 1 & 0 \\ 0 & 0 & 1 \end{bmatrix}$$

In this example, an identity matrix value of 1 indicates that a given node (e.g., node represented by column 1, row 1) has an edge to itself. In general, network graphs seldom have nodes with connections to themselves, but in disclosed techniques during neighbor convolution feature generation, it is beneficial for a node to consider its own features in addition to considering its neighbors nodes' features. Said another way, neighbor convolution module 172 causes nodes to consider itself a neighbor during feature convolution. In order to accomplish this during feature convolution, neighbor convolution module 172 generates an identity matrix with values of "1" in the diagonal to cause each node to become a neighbor to itself.

In addition to generating the adjacency matrix and the identity matrix, matrix module 560 generates a feature matrix that store the node behavior feature values generated by node behavior module 310 for nodes in the network graph 512. For example, an entry in the feature matrix at column one (which represents entity 550 node) and row 2 (which represents $1^{st}$ hop neighbor node 510C) might store a value indicating the total inflow 422 for $1^{st}$ hop neighbor 510C node. Based on the adjacency matrix, identity matrix, and feature matrix, neighbor convolution module 172 may calculate neighbor convolution features. For example, matrix module 560 calculates the neighbor convolution features by generating a neighbor convolution matrix. Matrix module 560 generates the neighbor convolution matrix by squaring the adjacency matrix, adding the result of the squaring to the identity matrix, and then multiplying the resulting matrix with the feature matrix. Matrix module 560 then inputs the neighbor convolution feature matrix 562 into independent component analysis module 570. Matrix module 560 generates the neighbor convolution feature matrix 562 for entity 550 node using the following equation:

$$B' = (A^2 + I)B$$

In this equation, B prime is the neighbor convolution feature matrix, "A" is the adjacency matrix, "I" is the identity matrix, and "B" is the feature matrix discussed above.

Independent component analysis module 570, in the illustrated embodiment, receives the neighbor convolution feature matrix 562 generated based on node behavior features of nodes in network graph 512 and performs an independent component analysis to compress the adjacency matrices. For example, the independent component analysis may reduce the neighbor convolution feature matrix 562 from thirty dimensions to four dimensions (e.g., columns) in order to reduce noise and improve the neighbor convolution feature matrix 562 for use in training a machine learning model to predict anomalies in entity behavior. After performing the reduction, independent component analysis module 570 outputs neighbor convolution features 372 for network graph 512.

While the example network graph 512 shown in FIG. 5 illustrates a network graph with neighbor convolution features determined for a single entity 550 (e.g., a user wallet), neighbor convolution module 172 may perform neighbor convolution feature extraction for multiple different entities in addition to entity 550. In some embodiments, neighbor convolution module 172 performs neighbor convolution feature extraction on a bi-partite network graph (that includes nodes representing both entity and electronic communications such as the example network graph 212 shown in FIG. 2). In some embodiments, neighbor convolution module 172 generates neighbor convolution features 372 for a given node based on neighboring nodes that are three or more hops away from the given node within a network graph 512.

Figure 6:
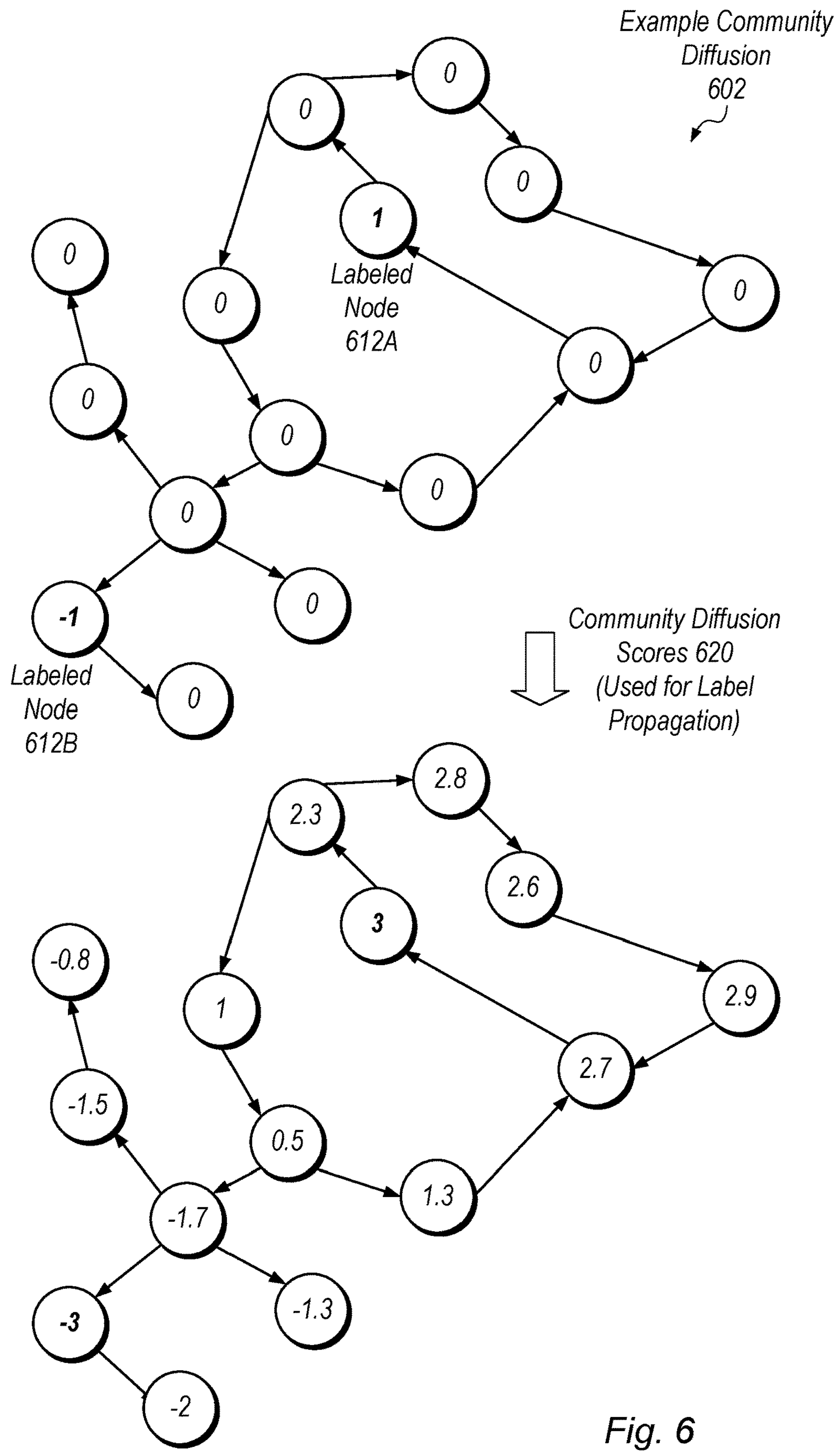
FIG. 6 is a block diagram illustrating example community diffusion feature generation, according to some embodiments.

FIG. 6 is a block diagram illustrating example community diffusion feature generation. In the illustrated embodiment, an example community diffusion calculation 602 is shown in the top half of the figure, while example community diffusion scores 620 (used for label propagation) are shown in the bottom half of the figure. As discussed above with reference to FIG. 3, community diffusion module 320 generates community diffusion features 322 by determining three community diffusion criteria for a given node: whether the node is surrounded by known anomalous nodes within a network graph, how far the given node is from a center the community of nodes in which is it located within the network graph, what the connectivity density of the given node is with one or more neighboring nodes (that are either known to be anomalous or known to not be anomalous).

In order to generate community diffusion features for a plurality of nodes in a network graph, community diffusion module 320 (shown in FIG. 3) calculates a community diffusion score for respective nodes of the network graph based on the three community diffusion criteria described above. The three community diffusion criteria specify to determine the following three for a given node: whether the community of the given node is a known anomalous community, the distance from a node located at the center of the community, and the density of anomalous vs. not anomalous nodes in the community. For example, community diffusion module 320 determines a community diffusion score for a given node according to the three community diffusion criteria.

To begin calculating community diffusion scores for nodes in a network graph, community diffusion module 320 identifies nodes in the network for which labels are known (i.e., nodes having labels indicating anomalous or not anomalous). The nodes of a network graph shown at the top portion of FIG. 6 include two labeled nodes 612A and 612B. Based on the known labels for these nodes, community diffusion module 320 assigns a community diffusion score of "1" to labeled node 612A, indicating that this node corresponds to an anomalous entity (e.g., a suspicious entity). Community diffusion module 320 assigns a community diffusion score of "−1" to labeled node 612B, indicating that this node corresponds to an entity that is not anomalous (e.g., this entity is not suspicious) and community diffusion scores of "0" to all other nodes (for which labels are not yet known). In the example embodiment of FIG. 6, a greater positive community diffusion score for a node indicates a higher likelihood that an entity corresponding to the node is anomalous, while a greater negative score for a node indicates a higher likelihood that an entity corresponding to the node is not anomalous. In various embodiments, the value of community diffusion scores may differ. For example, a community diffusion score of "10" might indicate an anomalous, while a community diffusion score of "−10" might indicate not anomalous. The scale used for community diffusion scores may be tuned by community diffusion module 320 or a system administrator according to performance during scoring.

After assigning initial community diffusion scores to nodes in the network graph, community diffusion module 320 calculates new community diffusion scores for the nodes based on the three criteria discussed above. The community diffusion module 320 calculates a new community diffusion score for a given node by aggregating the initial community diffusion scores of neighboring nodes of the given node. For example, community diffusion module 320 calculates a community diffusion score for a node that is one hop away from labeled node 612B using the following equation:

$$H^l = D^{-\frac{1}{2}}(A + I)D^{-\frac{1}{2}}H^{l-1}$$

In the equation above, H is the community diffusion score of a given node, L u] is the number of hops of the given node from a center node (such as labeled node 612B), D is a diagonal node degree matrix (e.g., a diagonal matrix with the number of neighbor nodes for the given node represented by the diagonal matrix entry on the diagonal), A is the same adjacency matrix determined and used by neighbor convolution module 172, and I is an identity matrix. The H in the equation above is the community diffusion score of all nodes in a network graph. For example, H is a vector and each entry in the vector is the score of a given node. After calculating the new community diffusion scores, community diffusion module 320 assigns the newly calculated scores to the nodes in the network graph as shown in the bottom portion of FIG. 6. In the example of FIG. 6, the newly calculated community diffusion scores shown in the bottom portion of the figure for each node are the community diffusion feature values of the nodes in this network.

Example Label Propagation

Figure 7:
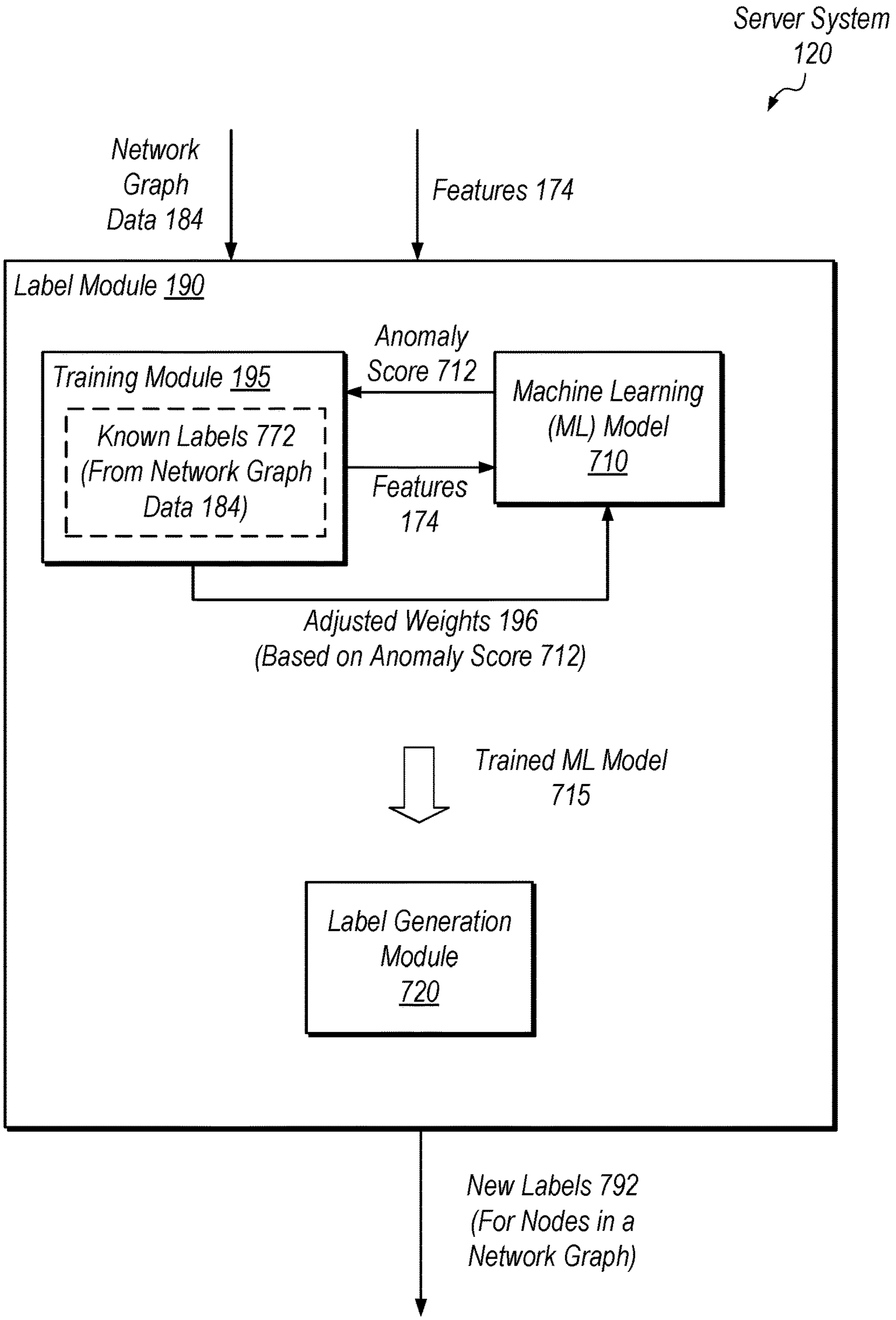
FIG. 7 is a block diagram illustrating an example label module, according to some embodiments.

FIG. 7 is a block diagram illustrating an example label module. In the illustrated embodiment, server system 120 includes label module 190, which in turn includes training module 195, machine learning (ML) model 710, and label generation module 720.

Label module 190, in the illustrated embodiment, receives network graph data 184 and features 174 (from graph module 160 and feature module 170, respectively, as shown in FIG. 1) and executes training module 195 to train a ML model 710 based on this information. For example, training module 195 inputs features 174 (e.g., node behavior features 312, neighbor convolution features 372, or community diffusion features 322) into ML model 710. Based on comparing anomaly scores 712, output by the ML model 710 for the nodes in the network graph based on their respective features 174, with known labels 772 for the nodes, training module 195 adjusts weights 196 of ML model 710. After adjusting the weights, training module 195 re-inputs features 174 into ML model 710 and re-evaluates new anomaly scores output by the model. This process continues at least until training module 195 is satisfied with new anomaly scores output by the ML model after weight adjustments. For example, if the anomaly scores 712 match known labels 772 within a threshold amount, then training module 195 may terminate training of the ML model 710. Once training is terminated, training module 195 provides the trained ML model 715 to label generation module 720.

Label generation module 720 executes the trained ML model 715 to generate new labels 792. For example, label generation module 720 inputs features (one or more of node behavior features 312, neighbor convolution features 372, and community diffusion features 322) for an unlabeled node into trained ML model 715 and, based on comparing the predicted anomaly score output by trained ML model 715 for the node, label generation module 720 generates and assigns a label to the node. As one example, if trained ML model 715 outputs an anomaly score of "0.9," then label generation module 720 will generate a label of "1" and assign it to the node, indicating that the entity corresponding to this node is anomalous. In other situations, label generation module 720 may replace existing (and often inaccurate) labels of nodes with new labels generated according to output of the trained ML model 715 for the nodes (based on different features for the nodes generated using the disclosed techniques discussed above with reference to FIGS. 1-6). In some embodiments, the new labels are generated for nodes which already have existing labels in order to replace the existing labels (e.g., with more accurate labels). In other embodiments, the new labels 792 are generated for entities for which labels are not yet known.

Example Methods

FIG. 8 is a flow diagram illustrating a method for generating multiple different types of new features from a network graph and training a machine learning model using the new features, according to some embodiments. The method 800 shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server system 120 performs the elements of method 800.

At 810, in the illustrated embodiment, a server system generates, from a plurality of electronic communications, a network graph that includes a plurality of nodes and edges. In some embodiments, the network graph is a bi-partite transaction network graph, where the nodes of the bi-partite transaction network graph correspond to both user accounts and electronic transactions. In some embodiments, one or more labels for nodes in the network graph specify that user accounts and electronic transactions corresponding to the nodes are known to be anomalous. In some embodiments, the entities participating in the electronic transactions are users of and have user accounts with the server system.

At 820, the server system captures a plurality of snapshots of the network graph, where the plurality of snapshots include nodes and edges existing at a plurality of time intervals. In some embodiments, the plurality of different time intervals include two different time intervals. In some embodiments, the plurality of snapshots are generated based on a 24-hour time interval. For example, a first snapshot of the network graph represents transactions that occurred (e.g., were initiated and completed) within a first 24-hour time period, while a second snapshot of the network graph represents transactions that occurred within a second 24-hour time period occurring immediately following the first 24-hour time period. In some embodiments, the plurality of snapshots are generated based on two different types time intervals. For example, a first set of snapshots of the network graph represent transactions that occurred within a 12-hour time window, while a second set of snapshots of the network graph represent transactions that occurred within a 24-hour time window that begins at a later time than the 12-hour time window. In some embodiments, a given node of the network graph is included in two or more of the plurality of snapshots of the bi-partite network graph. For example, if the time intervals for two respective snapshots overlap, a given transaction occurring within the overlapping time interval will be included in both snapshots.

At 830, the server system generates, for nodes included in respective snapshots of the plurality of snapshots, a plurality of different types of features. In some embodiments, generating the plurality of different types of features includes generating one or more community diffusion features. In some embodiments, generating the one or more community diffusion features includes identifying, in a given snapshot of the network graph, whether nodes included in the given snapshot have anomalous labels. In some embodiments, generating the one or more community diffusion features includes determining, using one or more distance procedures, distances between unlabeled nodes of the given snapshot and the one or more nodes identified to have anomalous labels. In some embodiments, generating the one or more community diffusion features includes determining a connectivity density for the unlabeled nodes, where determining the connectivity density for a given unlabeled node includes identifying a number of nodes connected to the given unlabeled node with anomalous labels.

In some embodiments, generating the plurality of different types of features includes generating a plurality of node behavior features, including determining one or more types of the following types of node behavior features: degree-related features, flow-related features, duration-related features, and interval-related features. In some embodiments, generating the plurality of different types of features includes generating one or more node behavior features, including one or more types of the following types of node behavior features: in-degree, out-degree, inflow, outflow, change of balance, input electronic communication duration, output electronic communication duration, input electronic communication interval, and output electronic communication interval.

At 840, the server system generates the plurality of different types of features by generating a neighbor convolution feature for a given node in a given snapshot. In some embodiments, generating the neighbor convolution feature for the given node in the given snapshot includes compressing a plurality of node behavior features for one or more neighbor nodes of the given node, where the one or more neighbor nodes are one hop away from the given node within the given snapshot of the network graph.

In some embodiments, the compressing includes generating an adjacency matrix that indicates, for different pairs of a first set of nodes that are a single hop away from a center node of the network graph, whether the different pairs of nodes of the first set of nodes are connected to one another in the network graph via one or more edges, where values stored in the adjacency matrix indicate weights of edges between respective pairs of nodes in the first set of nodes. In some embodiments, the compressing includes generating an identity matrix that indicates whether nodes in the network graph include one or more loop edges connected to themselves. In some embodiments, the compressing includes generating a feature matrix that includes node behavior features for nodes in the first set of nodes, squaring the adjacency matrix, adding a result of the squaring to the identity matrix, multiplying a result of the adding with the feature matrix, and performing independent component analysis on a result of the multiplying. In some embodiments, the server system performs the compressing to generate neighbor convolution features for the given node by compressing a plurality of node behavior features for one or more neighbor nodes of the given node that are at least two hops away from the given node within the given snapshot of the network graph. In some embodiments, the compressing includes combining the adjacency matrix, the identity matrix, and the features matrix. In some embodiments, the compressing includes performing independent component analysis on the combination.

At 850, the server system trains, using the plurality of different types of features, a machine learning model, where the trained machine learning model is usable to predict whether one or more unlabeled nodes in the network graph are anomalous. In some embodiments, the server system determines, using the trained machine learning model, labels for one or more unlabeled nodes in the network graph, where the determining includes inputting features for the one or more unlabeled nodes into the trained machine learning model. In some embodiments, the server system performs, based on the determined labels, one or more preventative actions for entities corresponding to one or more nodes based on the determined labels for the one or more unlabeled nodes indicating anomalous behavior for entities corresponding to the unlabeled one or more nodes. For example, an entity that is exhibiting anomalous behavior may be a suspicious or even malicious entity. In such situations, the disclosed server system performs one or more preventative actions (e.g., locks an account of the entity) to prevent the suspicious entity from performing additional actions (e.g., initiating fraudulent transactions) within the system.

FIG. 9 is a flow diagram illustrating a method for maintaining a network graph by updating labels in the graph based on features generated using at least two different feature extraction procedures, according to some embodiments. The method 900 shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server system 120 performs the elements of method 900.

At 910, in the illustrated embodiment, a server system accesses a machine learning model trained using a plurality of different features generated using two or more feature extraction procedures. In some embodiments, the two or more feature extraction procedures include two or more of the following types of feature extraction procedures: node behavior feature extraction, neighbor convolution feature extraction, and community diffusion feature extraction. In some embodiments, the node behavior features include one or more of the following types of features: in-degree, out-degree, inflow, outflow, change of balance, input electronic communication duration, output transaction duration, input transaction interval, and output transaction interval.

In some embodiments, generating the plurality of different features using two or more feature extraction procedures includes using a first feature extraction procedure to generate neighbor convolution features. In some embodiments, generating a given neighbor convolution feature for a given node in the network graph includes compressing a plurality of node behavioral features for one or more neighbor nodes to the given node, where the one or more neighbor nodes are one hop away from the given node within the network graph. In some embodiments, the server system updates, using the neighbor convolution features, the trained machine learning model. In some embodiments, generating the community diffusion features includes identifying whether one or more nodes in the bi-partite network graph have anomalous labels and determining distances between unlabeled nodes of the bi-partite network graph and the one or more nodes identified to have anomalous labels. In some embodiments, generating the community diffusion features includes determining a connectivity density for the unlabeled nodes, where determining the connectivity density for a given unlabeled node includes identifying a number of nodes connected to the given unlabeled node with anomalous labels.

In some embodiments, the two or more feature extraction procedures include a neighbor convolution feature extraction procedure. In some embodiments, executing the neighbor convolution feature extraction procedure includes generating an adjacency matrix that indicates, for different pairs of nodes of a first set of nodes that are a single hop away from a labeled node of the bi-partite network graph, whether the pairs of nodes of the first set of nodes are connected to one another in the bi-partite network graph via one or more edges, where values stored in the adjacency matrix indicate weights of the connections between respective pairs of nodes in the first set of nodes. In some embodiments, executing the neighbor convolution feature extraction procedure includes generating an identity matrix that indicates whether nodes in the bi-partite network graph include one or more loop edges connected to themselves and generating a feature matrix that includes node behavior features for nodes in the first set of nodes. In some embodiments, executing the neighbor convolution feature extraction procedure includes combining the adjacency matrix, the identity matrix, and the feature matrix. In some executing the procedure further includes performing independent component analysis on the combination of the three matrices.

In some embodiments, prior to the accessing, the server system retrieves a plurality of electronic communications. In some embodiments, the server system divides, based on a time interval, the plurality of electronic communications into different sets of electronic communications. In some embodiments, the server system generates for the different sets of electronic communications, a plurality of snapshots of a network graph that includes edges corresponding to the plurality of electronic communications and nodes corresponding to a plurality of different entities participating in the electronic communications. In some situations, the time interval is a sliding twelve-hour time window, where a first set of electronic communications generated during the dividing includes electronic communications initiated within a first twelve-hour time window from 10 AM to 10 PM while a second set of electronic communications generated during the dividing includes electronic communications initiated within a second, twelve-hour time window that is shifted one hour later than the first twelve-hour time window from 11 AM to 11 PM.

At 920, the server system determines, using the machine learning model, labels for one or more unlabeled nodes in a network graph whose nodes correspond to different entities and whose edges correspond to different electronic communications executed between the different entities, where the determining is performed based on output of the machine learning model for values of the plurality of different features corresponding to the one or more unlabeled nodes. In some embodiments, the server system determines, using the machine learning model, new labels for one or more labeled nodes in the network graph. In some embodiments, the server system compares the new labels with existing labels currently assigned to the one or more labeled nodes of the network graph. In some embodiments, in response identifying that a new label and an existing label corresponding to a given node in the network graph do not match the server system updates the given node by replacing the existing label for the given node with the new label. For example, existing labels may be gathered from any of various sources and treated as a ground-truth or starting point for identifying anomalous entities. Such sources may be out of date or inaccurate. The disclosed label checking and updating techniques execute a machine learning model trained on multiple different types of features (e.g., community diffusion, neighbor convolution, behavior, etc. features) to generate updated, accurate labels for the entities represented via nodes of the disclosed network graph.

At 930, the server system updates, based on the determining, the network graph, where the updating includes assigning the determined labels to the one or more unlabeled nodes in the network graph. In some embodiments, the network graph is a bi-partite transaction network graph, where the nodes of the bi-partite transaction network graph correspond to both electronic wallets and electronic transactions. In some embodiments, the labels for one or more unlabeled nodes in the network graph indicate whether electronic wallets and electronic transactions corresponding to the one or more unlabeled nodes are anomalous.

At 940, the server system performs one or more preventative actions for one or more entities corresponding to the one or more nodes with the assigned labels, where the one or more preventative actions are performed based on the assigned labels indicating that behavior of entities corresponding to the one or more nodes are anomalous.

Example Computing Device

Figure 10:
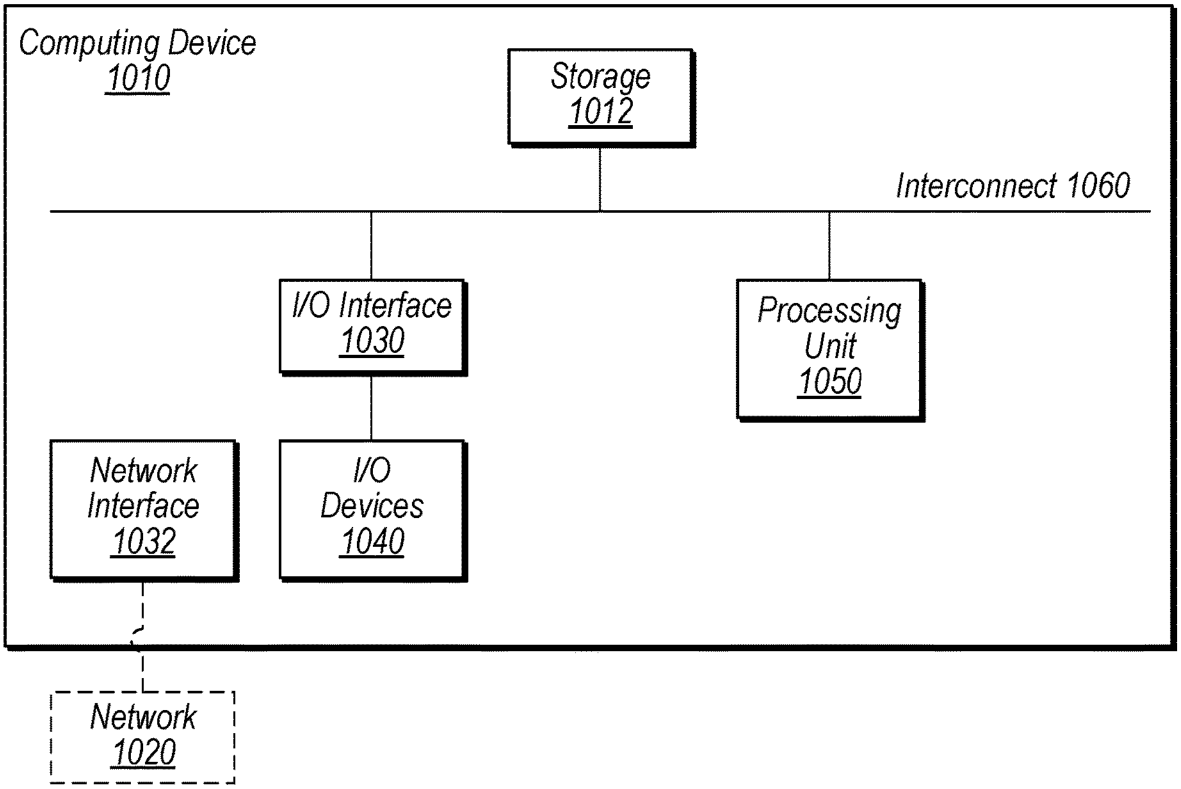
FIG. 10 is a block diagram illustrating an example computing device, according to some embodiments.

Turning now to FIG. 10, a block diagram of one embodiment of computing device 1010 (which may also be referred to as a computing system) is depicted. Computing device 1010 may be used to implement various portions of this disclosure. Computing device 1010 may be any suitable type of device, including, but not limited to, a personal computer system, desktop computer, laptop or notebook computer, mainframe computer system, web server, workstation, or network computer. The server system 120 shown in FIG. 1 and discussed above is one example of computing device 1010. As shown, computing device 1010 includes processing unit 1050, storage 1012, and input/output (I/O) interface 1030 coupled via an interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

In various embodiments, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory, in one embodiment. Source database 150, discussed above with reference to FIG. 1 is one example of storage subsystem 1012. Storage subsystem 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

generating, by a server system from a plurality of electronic transactions, a bi-partite transaction network graph that includes a plurality of nodes and edges, wherein the plurality of nodes correspond to both user accounts and electronic transactions, and wherein labels for one or more of the plurality of nodes specify that one or more user accounts and electronic transactions are anomalous;

capturing, by the server system, a plurality of snapshots of the network graph, wherein the plurality of snapshots include nodes and edges existing at a plurality of different time intervals;

generating, by the server system for nodes included in respective snapshots of the plurality of snapshots, a plurality of different types of features, wherein generating the plurality of different types of features includes generating a neighbor convolution feature for a given node in a given snapshot by:

compressing a plurality of node behavior features for one or more neighbor nodes of the given node, wherein the one or more neighbor nodes are one hop away from the given node within the given snapshot of the network graph; and training, by the server system using the plurality of different types of features, a machine learning model, wherein the trained machine learning model is usable to predict whether one or more unlabeled nodes in the network graph are anomalous.

2. The method of claim 1, further comprising:

determining, by the server system using the trained machine learning model, labels for one or more unlabeled nodes in the network graph, wherein the determining includes inputting features for the one or more unlabeled nodes into the trained machine learning model; and performing, by the server system based on the determined labels, one or more preventative actions for entities corresponding to one or more nodes based on the determined labels for the one or more unlabeled nodes indicating anomalous behavior for entities corresponding to the unlabeled one or more nodes.

3. The method of claim 1, wherein the compressing includes:

generating an adjacency matrix that indicates, for different pairs of a first set of nodes that are a single hop away from the given node, whether the different pairs of nodes of the first set of nodes are connected to one another in the network graph via one or more edges, wherein values stored in the adjacency matrix indicate weights of edges between respective pairs of nodes in the first set of nodes; and generating an identity matrix that indicates whether nodes in the network graph include one or more loop edges connected to themselves.

4. The method of claim 3, further comprising:

performing, by the server system, the compressing for a second set of nodes that are at least two hops away from the given node of the network graph.

5. The method of claim 3, wherein the compressing further includes:

generating a feature matrix that includes node behavior features for nodes in the first set of nodes;

squaring the adjacency matrix;

adding a result of the squaring to the identity matrix;

multiplying a result of the adding with the feature matrix; and performing independent component analysis on a result of the multiplying.

6. The method of claim 1, wherein generating the plurality of different types of features includes generating one or more community diffusion features by:

identifying, in a given snapshot of the network graph, whether nodes included in the given snapshot have anomalous labels;

determining, using one or more distance procedures, distances between unlabeled nodes of the given snapshot and the one or more nodes identified to have anomalous labels; and determining a connectivity density for the unlabeled nodes, wherein determining the connectivity density for a given unlabeled node includes identifying a number of nodes connected to the given unlabeled node with anomalous labels.

7. The method of claim 1, wherein generating the plurality of different types of features includes generating a plurality of node behavior features, including determining one or more types of the following types of node behavior features: degree-related features, flow-related features, duration-related features, and interval-related features.

8. The method of claim 7, wherein the degree-related features, the flow-related features, the duration-related features, and the interval-related features include the following: in-degree, out-degree, total degree, inflow, outflow, change of balance, input electronic communication duration, output transaction duration, input transaction interval, output transaction interval, and total transaction interval.

9. A non-transitory computer-readable medium having instructions stored thereon that are executable by a server system to perform operations comprising:

generating, from a plurality of electronic transactions, a bi-partite transaction network graph that includes a plurality of nodes and edges, wherein the plurality of nodes correspond to both user accounts and electronic transactions, and wherein labels for one or more of the plurality of nodes specify that one or more user accounts and electronic transactions are anomalous;

capturing a plurality of snapshots of the bi-partite transaction network graph, wherein the plurality of snapshots include nodes and edges existing at a plurality of different time intervals;

generating, for nodes included in respective snapshots of the plurality of snapshots, a plurality of different types of features, wherein generating the plurality of different types of features includes generating a neighbor convolution feature for a given node in a given snapshot by:

compressing a plurality of node behavior features for one or more neighbor nodes to the given node, wherein the one or more neighbor nodes are one hop away from the given node within the given snapshot of the bi-partite transaction network graph; and training, using the plurality of different types of features, a machine learning model, wherein the trained machine learning model is usable to predict whether one or more unlabeled nodes in the bi-partite transaction network graph are anomalous.

10. The non-transitory computer-readable medium of claim 9, wherein the compressing includes:

generating an adjacency matrix that indicates, for different pairs of a first set of nodes that are a single hop away from a center node of the bi-partite transaction network graph, whether the different pairs of nodes of the first set of nodes are connected to one another in the bi-partite transaction network graph via one or more edges, wherein values stored in the adjacency matrix indicate weights of edges between respective pairs of nodes in the first set of nodes.

11. The non-transitory computer-readable medium of claim 9, wherein generating the plurality of different types of features includes generating one or more community diffusion features by:

identifying, in a given snapshot of the bi-partite transaction network graph, whether nodes included in the given snapshot have anomalous labels;

determining, using one or more distance procedures, distances between unlabeled nodes of the given snapshot and the one or more nodes identified to have anomalous labels; and determining a connectivity density for the unlabeled nodes, wherein determining the connectivity density for a given unlabeled node includes identifying a number of nodes connected to the given unlabeled node with anomalous labels.

12. The non-transitory computer-readable medium of claim 10, wherein the compressing further includes:

generating an identity matrix that indicates whether nodes in the bi-partite transaction network graph include one or more loop edges connected to themselves;

generating a feature matrix that includes node behavior features for nodes in the first set of nodes;

combining the adjacency matrix, the identity matrix, and the feature matrix; and performing independent component analysis on the combination.

13. The non-transitory computer-readable medium of claim 9, wherein generating the plurality of different types of features includes generating one or more node behavior features, including one or more types of the following types of node behavior features: in-degree, out-degree, inflow, outflow, change of balance, input electronic communication duration, output electronic communication duration, input electronic communication interval, and output electronic communication interval.

14. The non-transitory computer-readable medium of claim 9, wherein the plurality of snapshots are generated for the bi-partite transaction network graph at different twenty-four-hour time intervals.

15. The non-transitory computer-readable medium of claim 14, wherein a given node is included in two or more of the plurality of snapshots of the bi-partite transaction network graph.

16. A system, comprising:

a processor; and a non-transitory computer-readable medium having stored thereon instructions that are executable by the processor to cause the system to perform operations comprising:

generating, from a plurality of electronic transactions, a bi-partite transaction network graph that includes a plurality of nodes and edges, wherein the plurality of nodes correspond to both user accounts and electronic transactions, and wherein labels for one or more of the plurality of nodes specify that one or more user accounts and electronic transactions are anomalous;

capturing, a plurality of snapshots of the network graph, wherein the plurality of snapshots include nodes and edges existing at a plurality of different time intervals;

generating, for nodes included in respective snapshots of the plurality of snapshots, a plurality of different types of features, wherein generating the plurality of different types of features includes generating community diffusion features for a plurality of nodes in a given snapshot by:

determining, using one or more distance procedures, a distance between unlabeled nodes included in a given snapshot and one or more labeled nodes located near the center of the given snapshot; and determining a connectivity density for the unlabeled nodes, including determining a number of nodes that the unlabeled nodes are connected to that are known to be anomalous; and training, using the plurality of different types of features, a machine learning model, wherein the trained machine learning model is usable to predict whether one or more unlabeled nodes in the network graph are anomalous.

17. The system of claim 16, wherein the instructions are further executable by the processor to cause the system to:

determine, using the trained machine learning model, labels for one or more unlabeled nodes in the network graph, wherein the determining includes inputting features for the one or more unlabeled nodes into the trained machine learning model; and perform, based on the determined labels, one or more preventative actions for entities corresponding to one or more nodes based on the determined labels for the one or more unlabeled nodes indicating anomalous behavior for entities corresponding to the unlabeled one or more nodes.

18. The system of claim 16, wherein generating the plurality of different types of features includes generating a neighbor convolution feature for a given node in a given snapshot by:

compressing a plurality of node behavior features for one or more neighbor nodes to the given node, wherein the one or more neighbor nodes are one hop away from the given node within the given snapshot of the network graph.

19. The system of claim 16, wherein generating the plurality of different types of features includes generating one or more community diffusion features by:

identifying, in a given snapshot of the network graph, whether nodes included in the given snapshot have anomalous labels;

determining, using one or more distance procedures, distances between unlabeled nodes of the given snapshot and the one or more nodes identified to have anomalous labels; and determining a connectivity density for the unlabeled nodes, wherein determining the connectivity density for a given unlabeled node includes identifying a number of nodes connected to the given unlabeled node with anomalous labels.

20. The system of claim 18, wherein the compressing includes:

generating an adjacency matrix that indicates, for different pairs of a first set of nodes that are a single hop away from a center node of the bi-partite transaction network graph, whether the different pairs of nodes of the first set of nodes are connected to one another in the bi-partite transaction network graph via one or more edges, wherein values stored in the adjacency matrix indicate weights of edges between respective pairs of nodes in the first set of nodes;

generating an identity matrix that indicates whether nodes in the bi-partite transaction network graph include one or more loop edges connected to themselves;

generating a feature matrix that includes node behavior features for nodes in the first set of nodes;

combining the adjacency matrix, the identity matrix, and the feature matrix; and performing independent component analysis on the combination.

* * * * *